(12) United States Patent
Chen (10) Patent No.: US 7,526,835 B2
(45) Date of Patent: May 5, 2009

(54) STABLE HINGE (75) Inventor: Wei-Chun Chen, Shulin (TW)

(73) Assignee: Shin Zu Shing Co. Ltd., Shulin, Taipei Hsien (TW)

(*) Notice: Subject to any disclaimer, the term of this patent is extended or adjusted under 35 U.S.C. 154(b) by 410 days.

(21) Appl. No.: 11/470,703

(22) Filed: Sep. 7, 2006

(65) Prior Publication Data

US 2008/0078060 A1   Apr. 3, 2008

(51) Int. Cl.
*E05D 3/10* (2006.01)

(52) U.S. Cl. .......................................... 16/367; 16/340

(58) Field of Classification Search .......... 16/337–339, 16/342, 330, 303, 374, 376, 377, 340, 367; 361/680–683, 814; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS

| | | | |
|---|---|---|---|
| 6,742,221 B2* | 6/2004 | Lu et al. ....................... 16/367 |
| 6,785,936 B2* | 9/2004 | Koshikawa .................. 16/328 |
| 6,798,646 B2* | 9/2004 | Hsu ........................... 361/681 |
| 6,912,122 B2* | 6/2005 | Chen et al. .................. 361/681 |
| 7,096,540 B2* | 8/2006 | Watanabe et al. ............. 16/367 |
| 7,146,195 B2* | 12/2006 | Sudo et al. ................ 455/575.1 |
| 7,189,023 B2* | 3/2007 | Kang et al. .................. 403/119 |
| 7,251,129 B2* | 7/2007 | Lee et al. ..................... 361/683 |
| 7,440,783 B2* | 10/2008 | Hyun ....................... 455/575.3 |
| 2004/0107540 A1* | 6/2004 | Hsu ........................... 16/366 |
| 2005/0207104 A1* | 9/2005 | Love .......................... 361/683 |
| 2005/0251965 A1* | 11/2005 | Lu et al. ....................... 16/367 |
| 2006/0282985 A1* | 12/2006 | Lu et al. ....................... 16/367 |

* cited by examiner

*Primary Examiner*—Chuck Y. Mah
(74) *Attorney, Agent, or Firm*—Apex Juris, pllc; Tracy M Heims (57) ABSTRACT

A stable hinge is mounted between a cover and a base of an electrical appliance and has a rotating bracket, two shaft assemblies, a stationary bracket, a stationary bracket and a positioning assembly. The shaft assemblies are mounted respectively on two sides of the rotating bracket and are mounted securely in the cover. The stationary bracket connects pivotally to the rotating bracket and is mounted securely in the base. The spacer assembly has a positioning spacer and a rotating spacer. The positioning spacer connects rotatably to the rotating bracket is mounted securely in the stationary bracket and has two resilient bends. The rotating spacer connects securely to the rotating bracket is mounted rotatably in the stationary bracket and has two resilient bends selectively abutting the resilient bends of the positioning spacer. The positioning assembly is formed between the positioning spacer and the rotating spacer.

9 Claims, 8 Drawing Sheets

STABLE HINGE

BACKGROUND OF THE INVENTION

1. Field of the Invention

The present invention relates to a hinge mounted between a cover and a base of an electrical appliance, especially to a stable hinge that securely holds the cover in position and prevents the cover from shaking.

2. Description of the Prior Art

Electrical appliances such as notebook computers, cell phones, etc. have a panel, a base and a conventional hinge. The conventional hinge connects the panel to the base along a transverse axis and a longitudinal axis to allow the panel to pivot and turn relative to the base. When the conventional hinge pivots along the transverse axis, the panel is opened or closed relative to the base. When the conventional hinge pivots along the longitudinal axis, the panel turns left or right relative to the base. To hold the cover in position when the conventional hinge pivots around the longitudinal axis the conventional hinge has a first positioning element, a second positioning element and a spring. The first positioning element rotates relative to the second positioning element. The first and second positioning elements have at least one corresponding protrusion and detent. The spring pushes the first and second positioning elements against each other. Therefore, the protrusion selectively engages the detent to hold the cover in position.

When the first positioning element rotates relative to the second positioning element and the protrusion does not engage the detent, the spring pushes the first and second positioning elements tightly against each other.

Consequently, the necessary force to rotate the first positioning element relative to the second positioning element is greater than the necessary force to engage the protrusion with the detent. Immediately prior to the protrusion engaging the detent a greater force is applied to the cover to rotate the first positioning element relative to the second positioning element. Therefore, too much force is applied to the cover at the instant when the protrusion engages the detent. Too much force easily causes the protrusion to disengage from the detent or the cover to shake and damage a panel in the cover.

To overcome the shortcomings, the present invention provides an intensifying-positioning and preventing shaking hinge to mitigate or obviate the aforementioned problems.

SUMMARY OF THE INVENTION

The main objective of the present invention is to provide a stable hinge that securely holds a cover in position and prevents the cover from shaking. The stable hinge is mounted between a cover and a base of an electrical appliance and has a rotating bracket, two shaft assemblies, a stationary bracket, a spacer assembly and a positioning assembly. The shaft assemblies are mounted respectively on sides of the rotating bracket and are mounted securely in the cover. The stationary bracket connects pivotally to the rotating bracket and is mounted securely in the base. The spacer assembly has a positioning spacer and a rotating spacer. The positioning spacer connects rotatably to the rotating bracket, is mounted securely in the stationary bracket and has two resilient bends. The rotating spacer connects securely to the rotating bracket, is mounted rotatably in the stationary bracket and has two resilient bends selectively abutting the resilient bends in the positioning spacer. The positioning assembly is formed between the positioning spacer and the rotating spacer. When the positioning assembly holds the cover in position relative to the base, the resilient bends abut each other.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
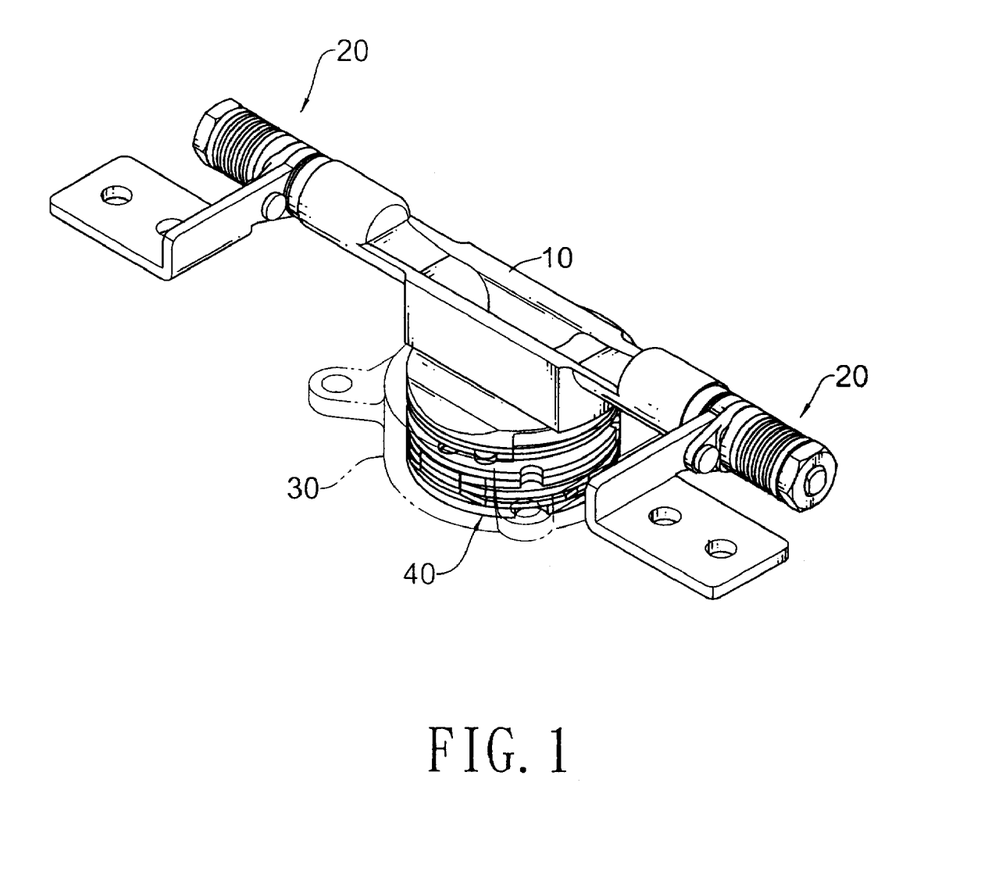
FIG. 1 is a perspective view of a stable hinge in accordance with the present invention.
Figure 2:
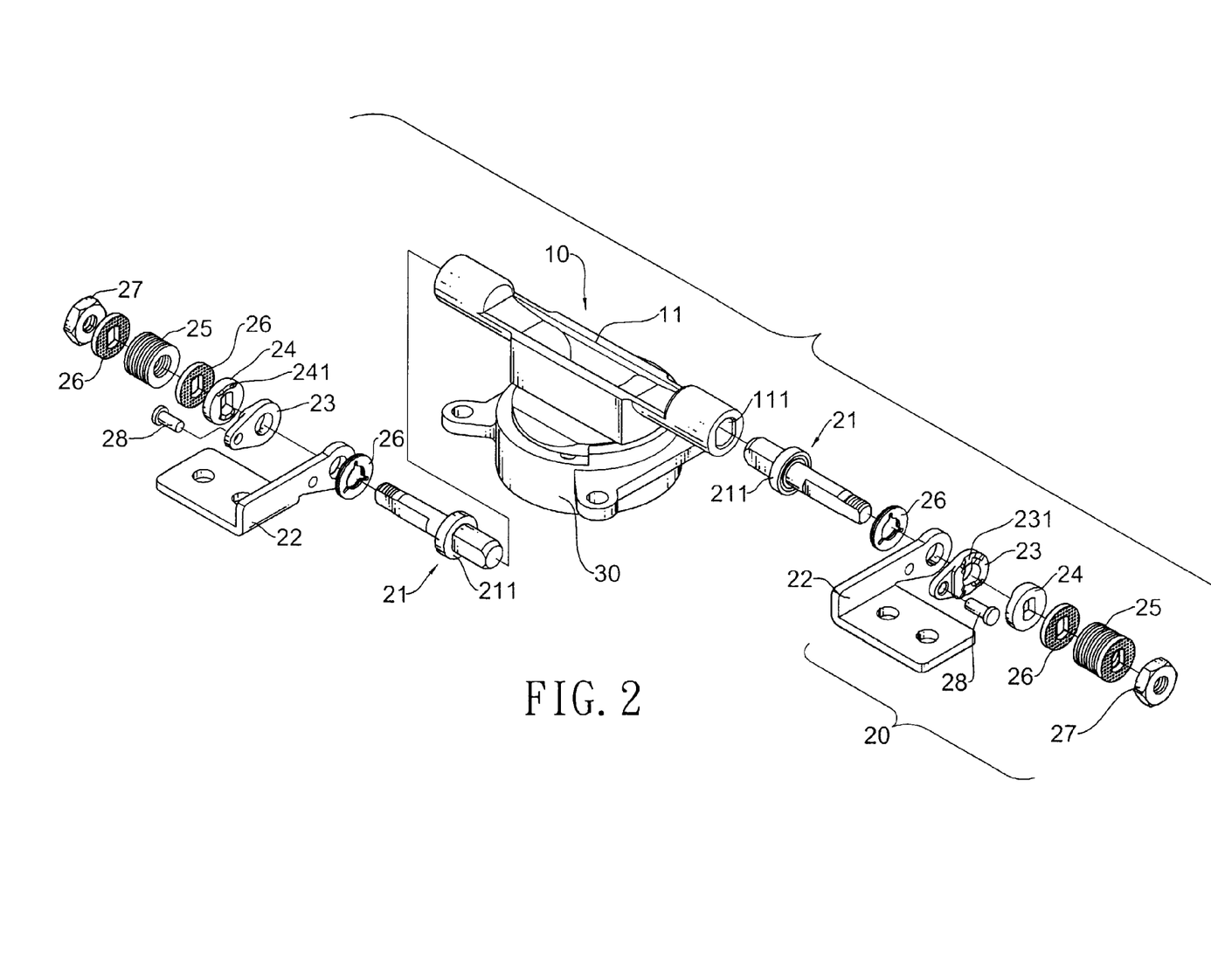
FIG. 2 is a partially exploded perspective view of the hinge in FIG. 1 with shaft assemblies of the hinge exploded.
Figure 3:
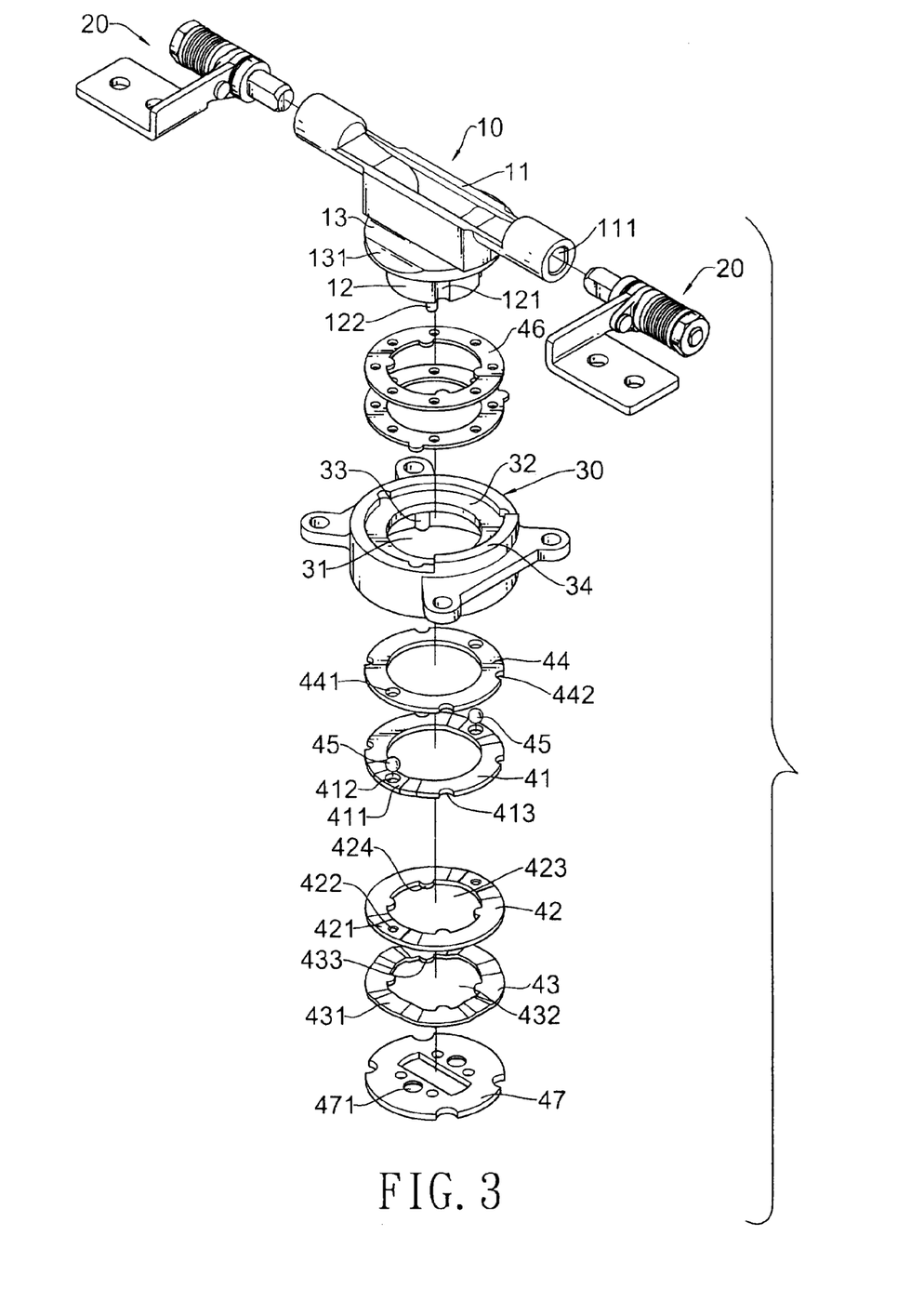
FIG. 3 is a partially exploded perspective view of the hinge in FIG. 1 with a stationary bracket and a spacer assembly of the hinge exploded.

With reference to FIGS. 1 to 3, a stable hinge in accordance with the present invention that securely holds a cover in position and prevents the cover from shaking comprises a rotating bracket (10), two shaft assemblies (20), a stationary bracket (30), a spacer assembly (40) and a positioning assembly.

The rotating bracket (10) has a top, a bottom two sides, a transverse arm (11), a longitudinal shaft (12) and a flange (13). The transverse arm (11) is formed transversely on the top of the rotating bracket (10) and has two ends and two keyholes (111). The keyholes (111) are coaxially formed respectively in the two ends of the transverse arm (11). The longitudinal shaft (12) is formed coaxially on and protrudes longitudinally from the bottom of the rotating bracket (10) and has a sidewalk a bottom, a top, multiple optional fastening grooves (121) and multiple optional posts (122). The fastening grooves (121) are formed longitudinally in the sidewall of the longitudinal shaft (12). The posts (122) are formed on and protrudes longitudinally from the bottom of the longitudinally shaft (12). The flange (13) is formed on and protrudes radially out from the top of the longitudinal shaft (12) and may have an edge and a limit (131). The limit (131) extends radially out of the edge of the flange (13).

The shaft assemblies (20) are mounted respectively on the two sides of the rotating bracket (10). Each shaft assembly (20) has a shaft (21), a leaf (22), an optional rotating positioning element (23), an optional stationary positioning element (24), a biasing member (25), multiple washers (26), a fastener (27) and an optional rivet (28).

Figure 5:
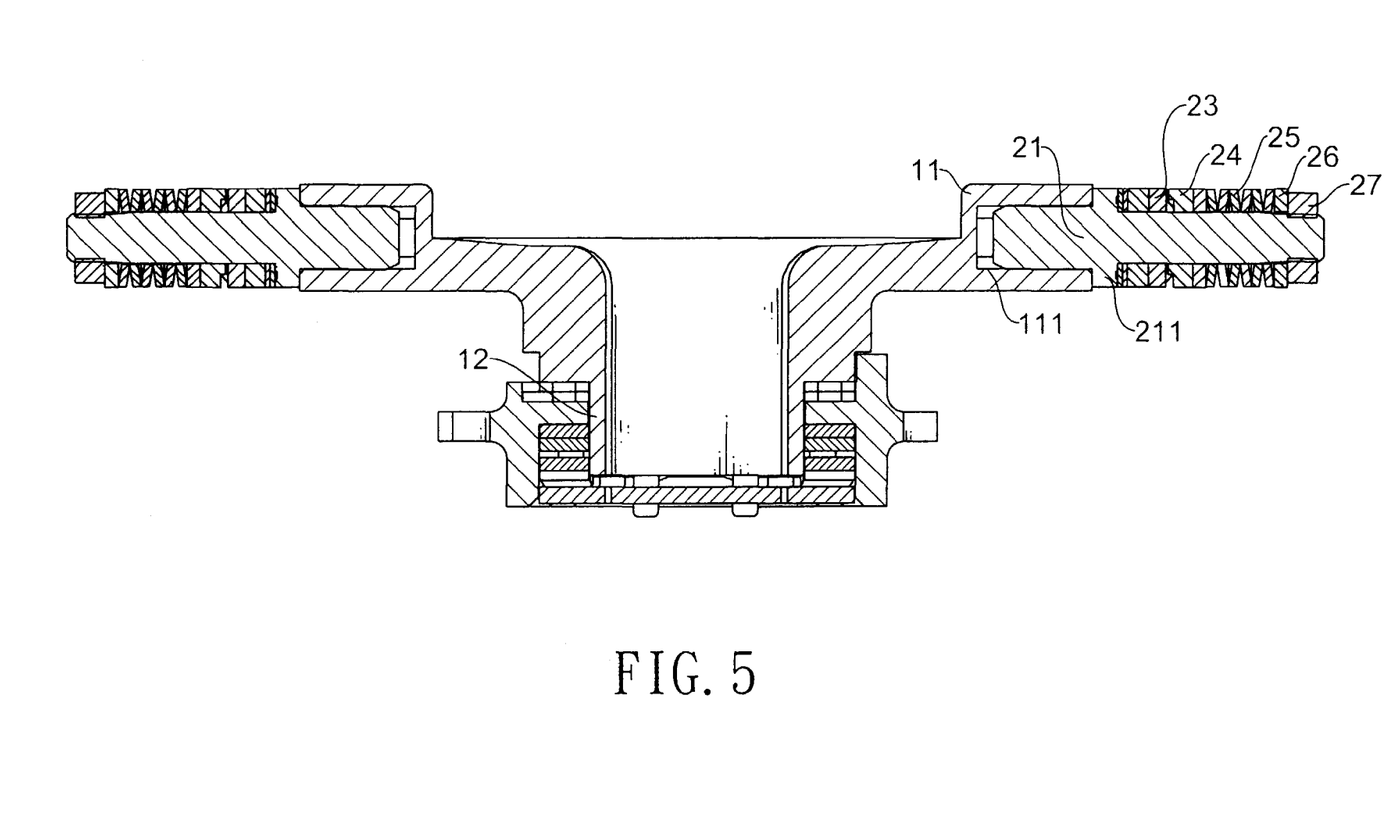
FIG. 5 is a cross-sectional side view of the hinge in FIG. 1.

With further reference to FIG. 5, the shafts (21) are mounted respectively in the keyholes (111) in the rotating bracket (10), and each shaft (21) has a keyed proximal end, a distal end and an optional flange (211). The keyed proximal ends correspond to and are mounted respectively in the keyholes (111). The flange (211) is formed on and extends radially out from the shaft (21) at the keyed proximal end and abuts the corresponding end of the transverse arm (11).

The leaf (22) is mounted rotatably around the shaft (21) against the flange (211).

The rotating positioning element (23) is mounted rotatably around the shaft (21), is attached securely to the leaf (22) and has an outside surface, an inside surface and at least one positioning detent (231). The positioning detent (231) is formed in the outside surface of the rotating positioning element (23).

The stationary positioning element (24) is mounted securely on the shaft (21), rotatably abuts the outside surface of the rotating positioning element (23) and has an inside surface and at least one positioning protrusion (241). The inside surface of the stationary positioning element (24) abuts the outside surface of the rotating positioning element (23). The positioning protrusion (241) is formed on the inside surface of the stationary positioning element (24) and selectively engages the positioning detent (231) in the rotating positioning element (23).

The biasing member (25) is mounted around the shaft (21) and presses the stationary positioning element (24) against the rotating positioning element (23).

The washers (26) are mounted around the shaft (21) to reduce the friction.

The fastener (27) is mounted securely on the end of the shaft (21) to hold the shaft assembly (20) together.

Figure 7:
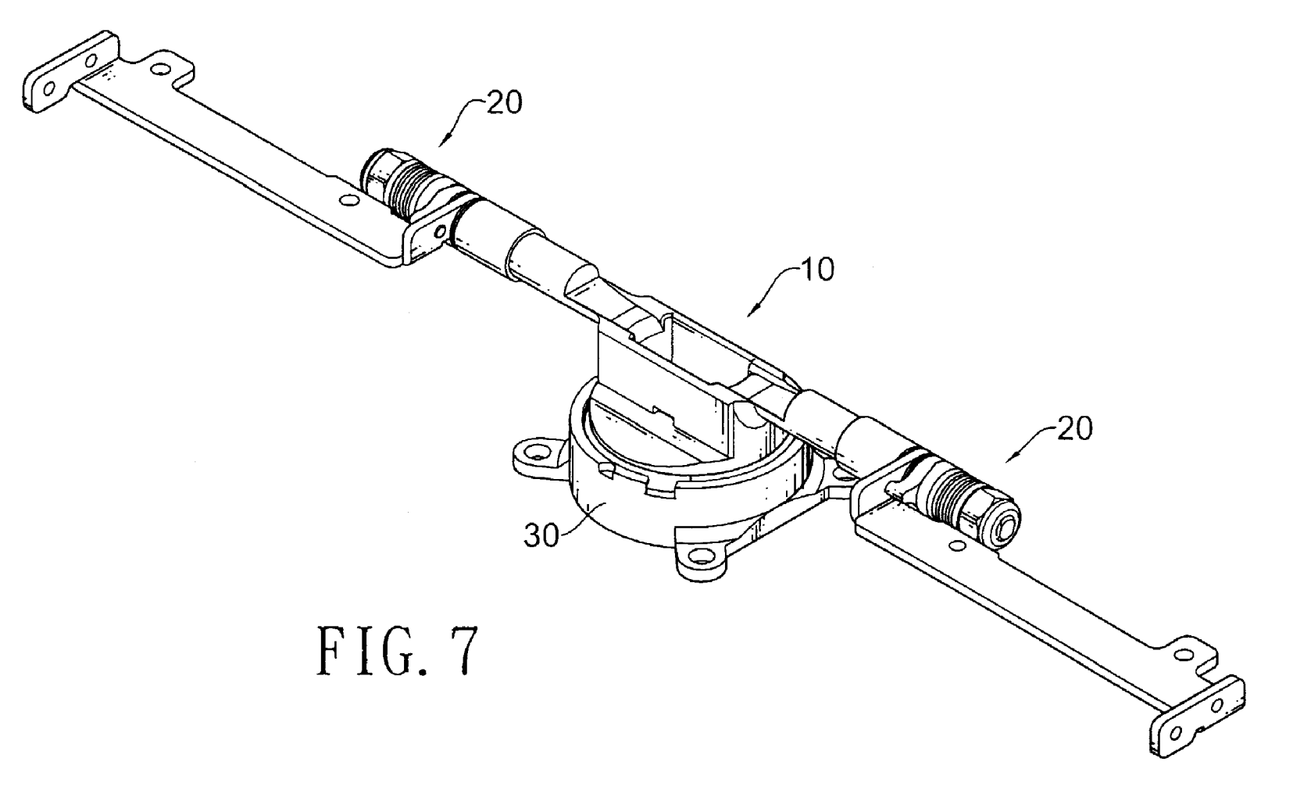
FIG. 7 is a perspective view of another embodiment of the stable hinge in accordance with the present invention.
Figure 8:
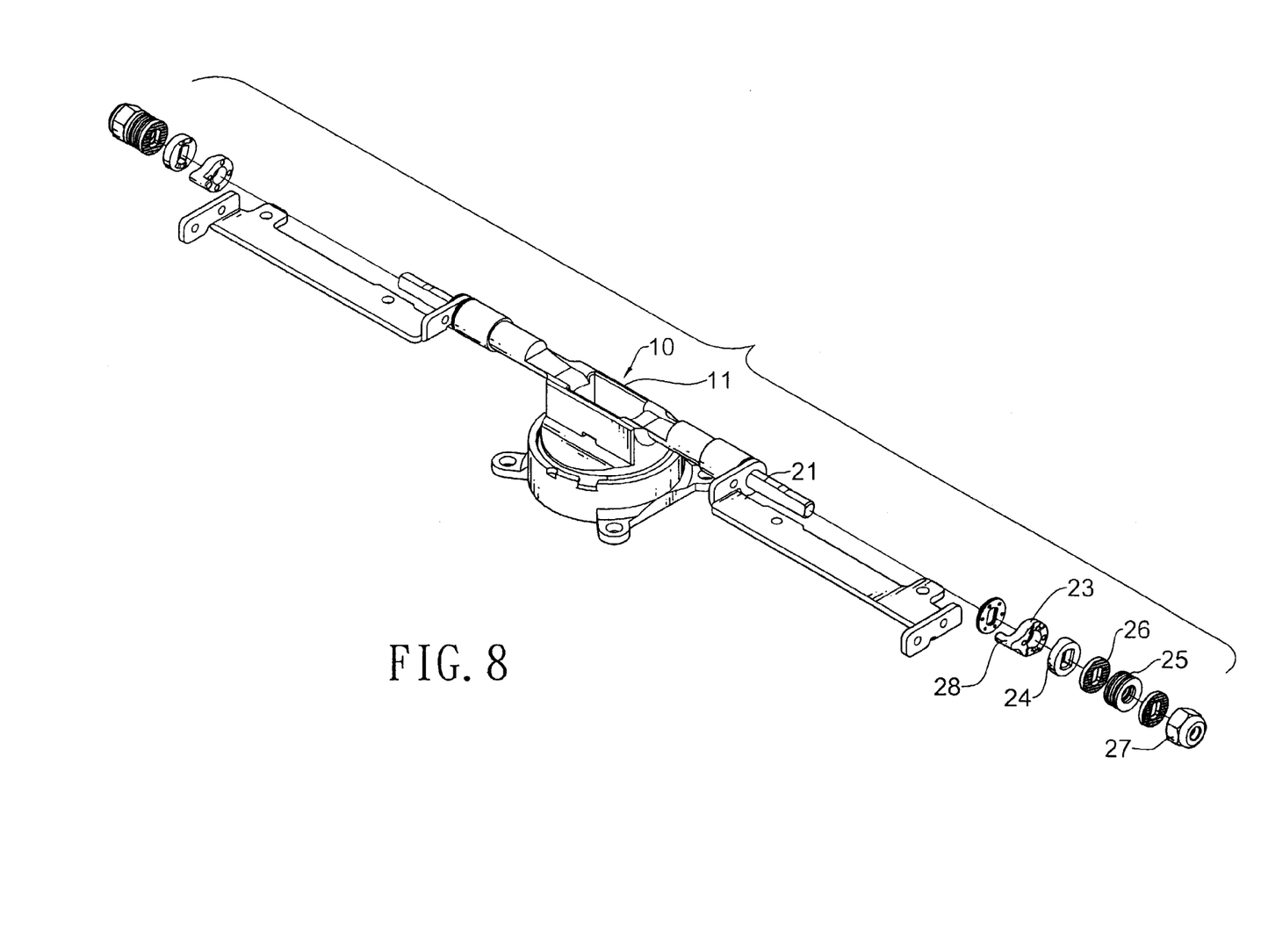
FIG. 8 is a partially exploded perspective view of the hinge in FIG. 7.

With further reference to FIGS. 7 and 8, the rivet (28) extends through the rotating positioning element (23) or is formed on the inside surface of the rotating positioning element (23) and extends through and is mounted securely in the leaf (22) to attach the rotating positioning element (23) securely to the leaf (22).

The stationary bracket (30) is mounted rotatably around the longitudinal shaft (12) of the rotating bracket (10) and has a top, a bottom, an inside wall, a central hole (31), an internal flange (32), an optional positive stop (34) and multiple optional fastening ribs (33). The internal flange (32) is formed on and protrudes in from the inside wall near the top. The positive stop (34) is formed on the top of the stationary bracket (30) and selectively abuts the limit (131) on the flange (13) of the rotating bracket (10) to limit the rotation of the rotating bracket (10). The fastening ribs (33) are formed longitudinally on the inside wall in the stationary bracket (30).

Figure 6:
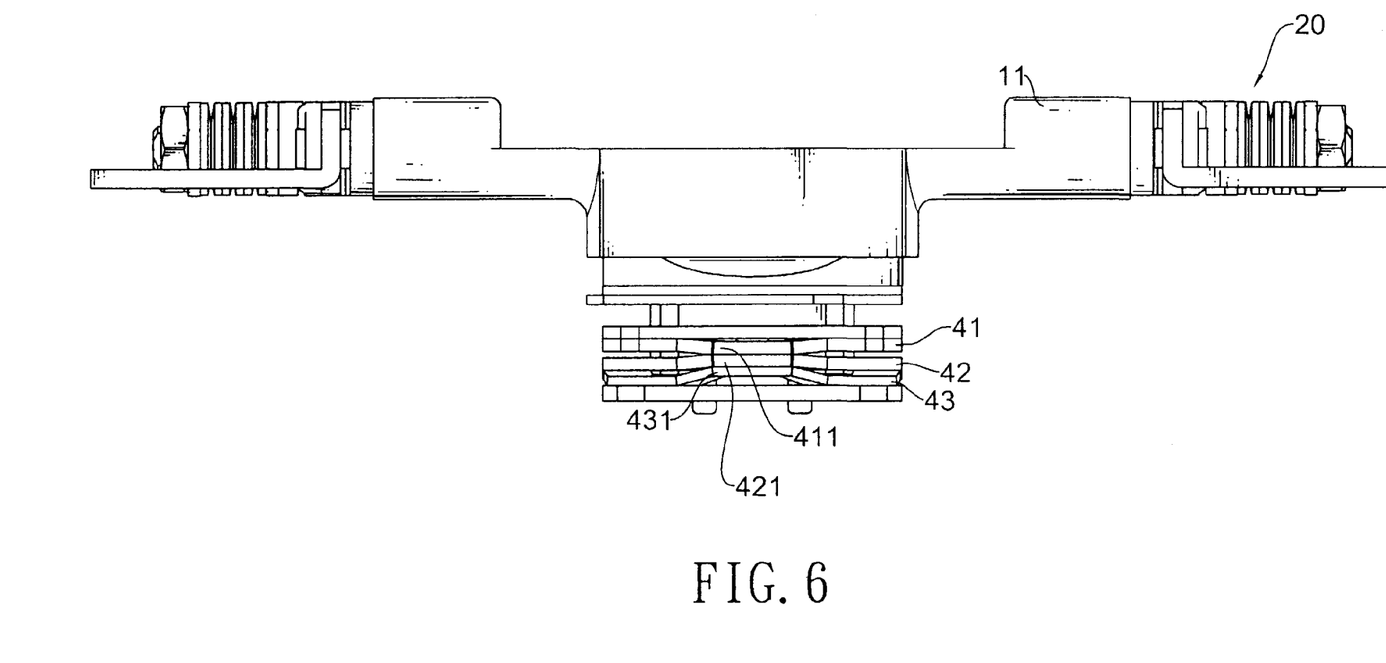
FIG. 6 is a side view of the hinge in FIG. 1.

With further reference to FIG. 6, the spacer assembly (40) is mounted around the longitudinal shaft (12) and in the stationary bracket (30) and comprises a positioning spacer (41), a rotating spacer (42), a resilient spacer (43), an optional holding spacer (44), multiple optional washers (46) and a fastening spacer (47).

The positioning spacer (41) is a ring, is mounted rotatably around the longitudinal shaft (12) and securely in the central hole (31) in the stationary positioning bracket (30) and has an inside edge, an outside edge, a bottom surface, two resilient bends (411), two optional mounting holes (412) and multiple optional notches (413). The resilient bends (411) are formed on the positioning spacer (41) between the inside edge and the outside edge and curve from the bottom surface of the positioning spacer (41). The mounting holes (412) are formed respectively through the resilient bends (411) on the positioning spacer (41). The notches (413) are formed in the outside edge of the positioning spacer (41) and engage the fastening ribs (33) in the stationary bracket (30) to hold the positioning spacer (41) securely in the stationary bracket (30).

The rotating spacer (42) is mounted securely on the longitudinal shaft (12) and rotatably in the stationary bracket (30) and has an inside edge, an outside edge, a top surface, a bottom surface, a central hole (423), two resilient bends (421), two optional detents (422) and multiple optional fastening protrusions (424). The top surface of the rotating spacer (42) is adjacent to the bottom surface of the positioning spacer (41). The resilient bends (421) are formed on the rotating spacer (42) between the inside edge and the outside edge, curve from the top surface of the rotating spacer (42) and selectively abut the resilient bends (411) on the positioning spacer (41). The detents (422) are formed respectively through the resilient bends (421) in the rotating spacer (42) and align respectively with the mounting holes (412) in the positioning spacer (41). The fastening protrusions (424) are formed on the inside edge of the rotating spacer (42) and engage the fastening grooves (121) in the longitudinal shaft (12) to hold the rotating spacer (42) securely on the longitudinal shaft (12).

The resilient spacer (43) is mounted securely on the longitudinal shaft (12) and rotatably in the stationary bracket (30) and has an inside edge, an outside edge, a top surface, a bottom surface, a central hole (432), two resilient bends (431) and multiple optional fastening protrusions (433). The top surface of the resilient spacer (43) is adjacent to the bottom surface of the rotating spacer (42). The resilient bends (431) are formed on the resilient spacer (43) between the inside edge and the outside edge, curve from the top surface of the resilient spacer (43) and correspond to the resilient bends (421) on the rotating spacer (42). The fastening protrusions (433) are formed on the inside edge in the resilient spacer (43) and engage the fastening grooves (121) in the longitudinal shaft (12) to hold the resilient spacer (43) securely on the longitudinal shaft (12).

The holding spacer (44) is mounted rotatably around the longitudinal shaft (12) and securely in the central hole (31) in the stationary positioning bracket (30) and has an inside edge, an outside edge, a bottom surface, two mounting holes (441) and multiple notches (442). The bottom surface of the holding spacer (44) is adjacent to the top surface of the positioning spacer (41). The mounting holes (441) are formed through the holding spacer (44) and align respectively with the mounting holes (412) in the positioning spacer (41). The notches (442) are formed in the outside edge and engage the fastening ribs (33) in the stationary bracket (30) to hold the holding spacer (44) in place in the stationary bracket (30).

The washers (46) are mounted around the longitudinal shaft (12) and in the stationary bracket (30) between the internal flange (32) in the stationary bracket (30) and the rotating bracket (10) to reduce the friction between the rotating bracket (10) and the stationary bracket (30).

The fastening spacer (47) is attached securely to the bottom of the longitudinal shaft (12) and may have multiple fastening holes (471). The fastening holes (471) are formed through the fastening spacer (47) and are mounted securely on the fastening posts (122) of the longitudinal shaft (12) to attach the fastening spacer (47) securely on the longitudinal shaft (12).

The positioning assembly is mounted between the positioning spacer (41) and the rotating spacer (42) and corresponds to the resilient bends (411, 421, 431) to hold the rotating bracket (10) in specific positions relative to the stationary bracket (30). The positioning assembly may have two positioning bails (45) mounted respectively in the mounting holes (412), respectively engaging the mounting holes (441) in the holding spacer (44) and selectively engaging the detents (422) in the rotating spacer (42).

Figure 4:
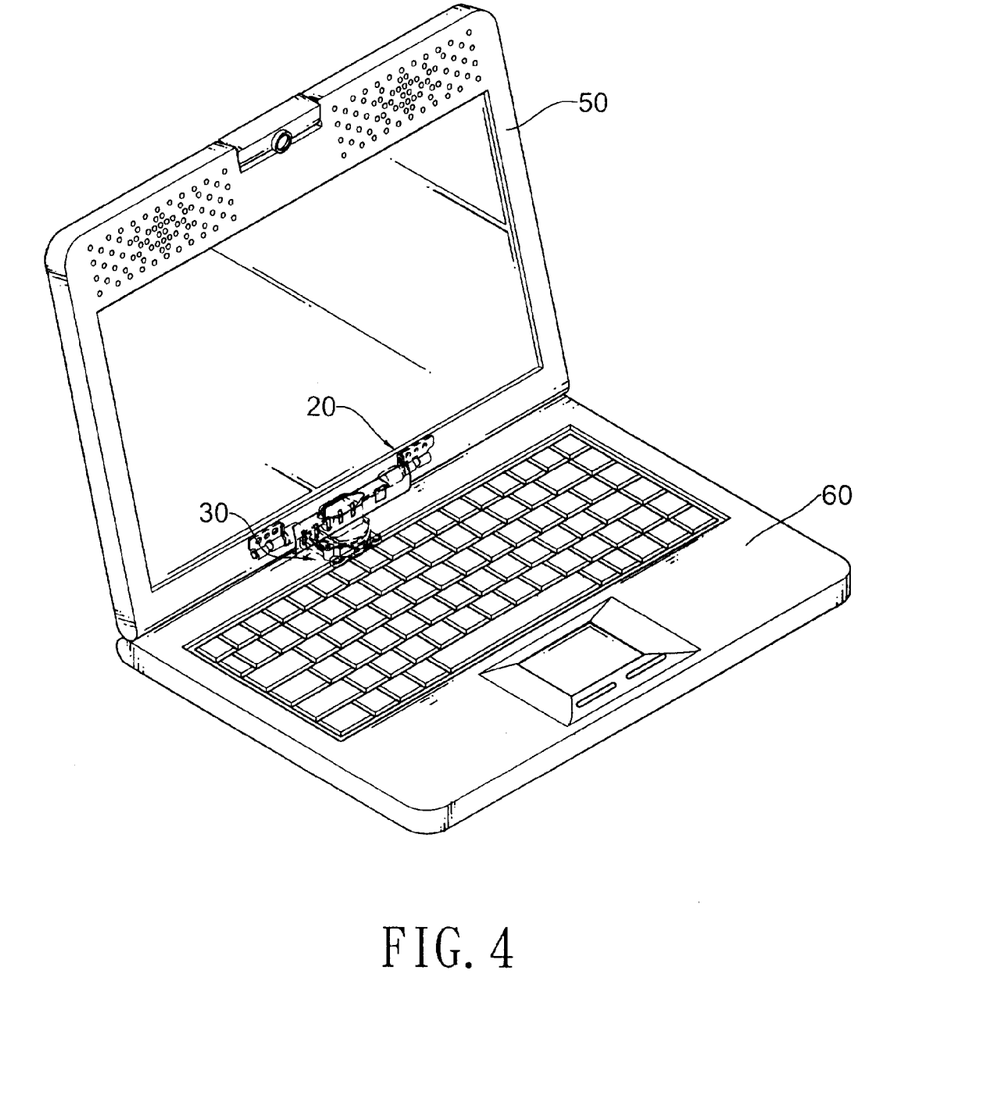
FIG. 4 is an operational perspective view of a notebook computer with the hinge in FIG. 1.

With further reference to FIG. 4, a notebook comprises a cover (50) and a base (60). The leaves (22) of the shaft assemblies (20) are mounted securely in the cover (50). The stationary bracket (30) is mounted securely in the base (60). When the cover (50) rotates relative to the base (60), the rotating bracket (10) rotates relative to the stationary bracket (30). Then the rotating spacer (42) rotates relative to the positioning spacer (41) and the holding spacer (44).

Because the positioning assemblies correspond to the resilient bends (411, 421, 431) and the resilient bends (411, 421, 431) abut each other, the spacers (41, 42, 43) abut each other tightly when the positioning bails (45) engage the detents (422) and the spacers (41, 42, 43) abut each other loosely when the positioning balls (45) disengage from the detents (422). Therefore, the force required to rotate the cover (50) relative to the base (60) is smaller than the force required to position the cover (50) relative to the base (60). Thus the positioning function is intensified, and the cover (50) is kept from shaking.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stable hinge comprising:
   a rotating bracket having
      a top;
      a bottom;
      two sides;
      a transverse arm being formed transversely on the top of the rotating bracket and having
         two ends; and
         two keyholes being coaxially formed respectively in the two ends;
      a longitudinal shaft being formed coaxially on and protruding longitudinally from the bottom of the rotating bracket and having
         a sidewall;
         a bottom; and
         a top; and
      a flange being formed coaxially on and protruding radially out from the bottom of the rotating bracket;
   two shaft assemblies being mounted respectively on the two sides of the rotating bracket, and each shaft assembly having
      a shaft being mounted securely in one of the keyholes in the rotating bracket;
      a leaf being mounted rotatably around the shaft;
      a biasing member being mounted around the shaft;
      multiple washers being mounted around the shaft; and
      a fastener being mounted securely on the end of the shaft to hold the shaft assembly together;
   a stationary bracket being mounted rotatably around the longitudinal shaft of the rotating bracket and having
      a top;
      a bottom;
      an inside wall;
      a central hole; and
      an internal flange being formed on and protruding in from the inside wall near the top;
   a spacer assembly being mounted around the longitudinal shaft and in the stationary bracket and comprising
      a positioning spacer being mounted rotatably around the longitudinal shaft and securely in the central hole in the stationary positioning bracket and having
         an inside edge;
         an outside edge;
         a bottom surface; and
         two resilient bends being formed on the positioning spacer between the inside edge and the outside edge and curving from the bottom surface of the positioning spacer;
      a rotating spacer being mounted securely on the longitudinal shaft and rotatably in the stationary bracket and having
         an inside edge;
         an outside edge;
         a top surface being adjacent to the bottom surface of the positioning spacer;
         a bottom surface;
         a central hole; and
         two resilient bends being formed on the rotating spacer between the inside edge and the outside edge, curving from the top surface of the rotating spacer and selectively abutting the resilient bends on the positioning spacer;
      a resilient spacer being mounted securely on the longitudinal shaft and rotatably in the stationary bracket and having
         an inside edge;
         an outside edge;
         a top surface being adjacent to the bottom surface of the rotating spacer;
         a bottom surface;
         a central hole; and
         two resilient bends being formed on the resilient spacer between the inside edge and the outside edge, curving from the top surface of the resilient spacer and corresponding to the resilient bends on the rotating spacer; and
      a fastening spacer being attached securely to the bottom of the longitudinal shaft; and
      a positioning assembly being mounted between the positioning and rotating spacers and corresponding to the resilient bends in the positioning and rotating spacers.

2. The hinge as claimed in claim 1, wherein
   the positioning spacer has two mounting holes formed respectively through the resilient bends on the positioning spacer;
   the rotating spacer has two detents formed respectively through the resilient bends on the rotating spacer and aligning respectively with the mounting holes in the positioning space; and
   the positioning assembly has two positioning balls mounted respectively in the mounting holes in the positioning spacer and selectively engaging the detents in the rotating spacer.

3. The hinge as claimed in claim 2, wherein the spacer assembly further comprises:
   a holding spacer mounted rotatably around the longitudinal shaft securely in the central hole of the stationary positioning bracket and having
      an inside edge;
      an outside edge;
      a bottom surface being adjacent to the top surface of the positioning spacer;
      two mounting holes formed separately through the holding spacer, aligning respectively with the mounting holes in the positioning spacer and respectively engaged by the positioning balls; and
   multiple notches formed in the outside edge and engaging the fastening ribs in the stationary bracket.

4. The hinge as claimed in claim 1, wherein each shaft assembly further comprises:

a rotating positioning element mounted rotatably around the shaft, attached securely to the leaf and having an outside surface;

an inside surface; and at least one positioning detent formed in the outside surface of the rotating positioning element; and a stationary positioning element mounted securely on the shaft, rotatably abutting the outside surface of the rotating positioning element and having an inside surface abutting the outside surface of the rotating positioning element; and at least one positioning protrusion formed in the inside surface of the stationary positioning element and selectively engaging the at least one positioning detent in the rotating positioning element; and the biasing member presses the stationary positioning element against the rotating positioning element.

5. The hinge as claimed in claim 4, wherein each shaft assembly further comprises a rivet extending through the rotating positioning element and extending through and mounted securely in the leaf.

6. The hinge as claimed in claim 4, wherein each shaft assembly further comprises a rivet formed on the inside surface of the rotating positioning element and extending through and mounted securely in the leaf.

7. The hinge as claimed in claim 1, wherein the flange of the rotating bracket having an edge; and a limit extending radially out of the edge of the flange of the rotating bracket; and the stationary bracket further having an positive stop formed on the top of the stationary bracket and selectively abutting the limit on the flange of the rotating bracket.

8. The hinge as claimed in claim 1, wherein the longitudinal shaft of the rotating bracket further has multiple fastening grooves formed longitudinally in the sidewall of the longitudinal shaft;

the stationary bracket further has multiple fastening ribs formed longitudinally on the inside wall in the stationary bracket;

the positioning spacer further has multiple notches formed in the outside edge of the positioning spacer and engaging the fastening ribs in the stationary bracket;

the rotating spacer further has multiple fastening protrusions formed on the inside edge of the rotating spacer and engaging the fastening grooves in the longitudinal shaft; and the resilient spacer further has multiple fastening protrusions formed on the inside edge of the resilient spacer and engaging the fastening grooves in the longitudinal shaft.

9. The hinge as claimed in claim 1, wherein the longitudinal shaft further has multiple fastening posts formed on and protruding longitudinally from the bottom of the longitudinally shaft;

the fastening spacer further has multiple fastening hole formed through the fastening spacer and mounted securely on the fastening posts of the longitudinal shaft;

the shaft of each shaft assembly has a keyed proximal end corresponding to and mounted in a corresponding keyhole;

a distal end; and a flange formed on and extending radially out from the shaft at the keyed proximal end and abutting a corresponding end of the transverse arm;

the leaves of the shaft assemblies are mounted respectively against the flanges on the shafts; and the spacer assembly further has multiple washers mounted around the longitudinal shaft and in the stationary bracket between the internal flange in the stationary bracket and the rotating bracket.

* * * * *